United States Patent [19]

Fugaro

[11] Patent Number: 5,887,267
[45] Date of Patent: Mar. 23, 1999

[54] BUS ARBITRATORS FOR COMMON LOCAL OSCILLATORS IN CELLULAR RADIOTELEPHONE BASE STATIONS

[75] Inventor: Anthony Salvatore Fugaro, Holly Springs, N.C.

[73] Assignee: Ericsson Inc., Research Triangle Park, N.C.

[21] Appl. No.: 832,755

[22] Filed: Apr. 4, 1997

[51] Int. Cl.⁶ .................................................. H04Q 07/30
[52] U.S. Cl. ........................... 455/561; 455/84; 455/103; 455/141; 455/318
[58] Field of Search ............................... 455/561, 84, 85, 455/86, 87, 76, 103, 132, 141, 255, 318, 319; 395/278, 293; 375/219; 370/362; 331/49, 74, 75

[56] References Cited

U.S. PATENT DOCUMENTS

| 5,142,693 | 8/1992 | Hanks et al. | 455/561 X |
| 5,592,480 | 1/1997 | Carney et al. | 455/561 X |

FOREIGN PATENT DOCUMENTS

| 0 200 040 | 12/1986 | European Pat. Off. | G06F 13/36 |
| 0 693 835 A2 | 1/1996 | European Pat. Off. | H04L 7/04 |
| 2 242 296 | 9/1991 | United Kingdom | H04Q 9/00 |

OTHER PUBLICATIONS

PCT International Search Report, PCT/US 98/06534.

*Primary Examiner*—Wellington Chin
*Assistant Examiner*—Philip J. Sobutka
*Attorney, Agent, or Firm*—Myers Bigel Sibley & Sajovec

[57] ABSTRACT

A transceiver board for use in a cellular radiotelephone base station comprises a first cellular radio transceiver including a first controller that controls the operation of the first transceiver, a second cellular radio transceiver including a second controller that controls the operation of the second transceiver, common local oscillator that generates a tuning signal used by the first and second transceivers for tuning a radio signal, and an arbitrator that is connected to the first and second controllers and that determines which of the first and second controllers communicates with the common local oscillator. Preferably, the arbitrator is implemented by a programmable device such as a programmable logic device (PLD) that monitors the first and second controllers to determine which controller attempts to communicate with the common local oscillator first so that that controller is allowed to communicate with a common local oscillator to the exclusion of the other controller. Alternatively, the arbitrator can be implemented by a programmable device that monitors the first and second controller and a tristate buffer that is connected to the programmable device and that connects either the first or second controller to the common local oscillator as controlled by the programmable device.

15 Claims, 6 Drawing Sheets

BUS ARBITRATORS FOR COMMON LOCAL OSCILLATORS IN CELLULAR RADIOTELEPHONE BASE STATIONS

FIELD OF THE INVENTION

The present invention generally relates to cellular communications systems, and more particularly, to the integration of two transceivers onto a single circuit board in a cellular radiotelephone base station.

BACKGROUND OF THE INVENTION

Cellular communications systems are commonly employed to provide voice and data communications to a plurality of mobile units or subscribers. Analog cellular systems, such as those designated AMPS, ETACS, NMT-450, and NMT-900, have been deployed successfully throughout the world. More recently, digital cellular systems such as those designated IS-54B in North America and the Pan-European GSM system have been introduced and deployed. These systems and other systems are described, for example, in the book entitled *Cellular Radio Systems* by Balston, et al., published by Artech House, Norwood, ME, 993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By doing so, many thousands of subscribers may be served by a system with only several hundred frequencies. In the United States, for example, Federal authorities have allocated to cellular communications a block of the UHF frequency spectrum that is further subdivided into pairs of narrow frequency bands called channels. Channel pairing results from the frequency duplex arrangement wherein the transmit and receive frequencies in each pair are offset by 45 megahertz (MHz). At present, there are 832, 30-KHz wide, radio channels allocated to cellular mobile communications in the United States. To address the capacity limitations of this analog system, a digital transmission standard designated IS-54B has been provided, wherein those frequency channels are further subdivided into three time slots.

In addition, capacity limitations have been addressed by using microcells, that is, low power cellular transmissions that provide coverage over a smaller area. The smaller microcelis allow more cells to exist within a predefined geographic area, thereby increasing the number of users that can be serviced within that geographic area. A particular application of microcell technology is indoor cellular radiotelephone services.

As illustrated in FIG. 1, an indoor cellular communication system 20 as in the prior art includes one or more mobile stations or units 22, one or more wall mounted base stations 24, a radio control interface 26, and a mobile switching center (MSC) 28. Although only one cell 30 is shown in FIG. 1, a typical indoor cellular network may have several cells 30, each cell usually being serviced by one or more wall mounted base stations 24. The number of wall mounted base stations 24 depends on the channel capacity of the cell 30. Each wall mounted base station typically supports anywhere from 4–12 channels, depending upon its site. The cell 30 typically has one or more control channels and one or more voice/data (hereafter referred to as "traffic") channels allocated to it. The control channel typically is a dedicated channel used for transmitting cell identification and paging information.

Each wall mounted base station 24 is connected to the radio control interface 26 by a radio interface link 32. The radio control interface 26 exchanges signals between the wall mounted base stations 24 and the mobile switching center 28. Specifically, the radio control interface 26 converts the traffic and control information from the format received over the radio interface links 32 into a format suitable for transmission over a dedicated transmission link 34 interconnecting the radio control interface (RCI) 26 to the MSC 28. In the reverse direction, the RCI 26 converts the traffic and control information received over transmission link 34 into a format suitable for transmission over radio interface links 32 to the respective base stations 24.

The MSC 28 is the central coordinating element of the overall cellular network 20. It typically includes a cellular processor 36 and a cellular switch 38, and provides an interface to the public switched telephone network (PSTN) 40. Through the cellular network 20, a duplex radio communication link 42 may be effected between two mobile units 22 and a landline telephone user 44. The function of the base stations 24 is commonly to handle the radio communications with the mobile units 22. In this capacity, the base stations 24 also supervise the quality of the link 42 and monitor the received signal strength from the mobile units 22.

A typical wall mounted base station 24 as in the prior art is schematically illustrated in FIG. 2. The base station 24 includes a radio link interface 50, a power supply 52, and one or more communication channel transceiver boards 54. In addition, the base station includes an antenna 56 associated with each of the communication channel transceiver boards 54. The radio link interface 50 provides an interface between the radio control interface 26 and the communication channel transceiver boards 54. In essence, the radio link interface 50 multiplexes/demultiplexes the signals to/from the radio control interface 26 for use by the communication channel transceiver boards 54. The power supply 52 provides power to the other components of the base station 24.

Further, the base station 24 includes a number N of communication channel transceiver boards 54 for effectuating radio communications with mobile units 22. Power for each of the communication channel transceiver boards is supplied by the power supply 52. Traffic and control signals are exchanged between the communication channel transceiver boards 54 and the radio link interface 50 over respective lines 58. In addition, the communication channel transceiver boards 54 are interconnected with one another by links 60 so that the transceiver boards 54 can receive traffic signals from more than one antenna 56 for reception diversity.

Each communication channel transceiver board 54 typically comprises a circuit board 66 having a single transceiver 68, for example, a radiotelephone, as illustrated in FIG. 3. The transceiver 68 includes a controller 70, a receive local oscillator (RXLO) 72, a transmit local oscillator (TXLO) 74, a frequency generator (FG) 76, a duplexer 78, an antenna 79, mixers 80 in the receive signal path, and mixers 81 in the transmit signal path. The controller 70 communicates with the RXLO 72, TXLO 74, and FG 76 to control the conversion of received radio frequency (RF) signals down to a baseband frequency for processing, and for the conversion of transmit signals to a radio frequency (RF) signal for transmission over the communication link 42. Further, the controller 70 exchanges traffic and control signals with the mobile switching center 28 via the radio link interface 50 and the radio control interface 26.

The RXLO 72, TXLO 74 and FG 76 are each configured to receive tuning information such as a division ratio from the controller 70 for generating a stable frequency signal used in performing conversion of the traffic signal in the receive signal path via mixer 80 and in the transmit signal path via mixer 81.

For example, in the receive signal path, the RF signal may be converted down to a receive intermediate frequency by subtracting the FG 76 signal from the RF signal at the mixer 80 associated with the FG 76. In general, the two signals are added by the mixer 80 and filtering is used to 30 isolate the resulting term that represents the difference of the two signals. The division ratio or tuning information is sent by the controller 70 to the FG 76 at power up or activation of the transceiver 68. This first conversion of of the received signal is referred to as the first down conversion stage in the received signal path. Next, the RXLO 72 further converts the received signal from the receive intermediate frequency to a base band frequency by further mixing the signal with a second frequency signal generated by the RXLO 72 at the mixer 80 associated with the RXLO 72. Filtering is then used to isolate the term that represents the difference of the two signals. The division ratio for the second frequency signal is also sent by the controller 70 to the RXLO 72 at power up. This is referred to as the second down conversion stage in the received signal path. At the base band frequency, the received traffic signal can then be processed by the digital control logic of the transceiver 68. In a like manner, traffic signals in the transmit signal path are initially converted from a baseband frequency to a transmit intermediate frequency in the first up conversion stage at the mixer 81 associated with the TXLO 74 using a division ratio provided to the TXLO 74 by the controller 70. The traffic signal is then converted up from the transmit intermediate frequency to a radio frequency in the second up conversion stage at the mixer 81 associated with a FG 76.

Note that the transmit intermediate frequency generally is mixed with the same local oscillator frequency used in the first down conversion in the received signal path. Therefore, if the same local oscillator frequency is used in both the first down conversion stage in the received signal path and the second up conversion stage in the transmit signal path, then only one FG 76 would be needed for transceiver 68. However, since the transmit and receive intermediate frequencies differ, a separate local oscillator may be necessary for each of the receive signal path and the transmit signal path so that the frequencies may be converted to/from the baseband frequency.

The RXLO 72, TXLO 74, and FG 76 can be programmed with respective division ratios in the following manner. During each power up or activation of the transceiver 68, the controller 70 sends several commands over a serial bus 84 which interconnects the controller 70 with the RXLO 72, the TXLO 74, and the FC 76. Each command sent over the serial bus 84 is addressed to a separate one of the RXLO 72, TXLO 74 and FG 76. The commands typically comprise a clock signal sent over one line of the bus, a M-bit data word sent over another line of the bus, and a select signal sent over one of the remaining lines of the serial bus, wherein each of the remaining bus lines is dedicated to one of the RXLO 72, TXLO 74 or FG 76. Each of the RXLO 72, TXLO 74 and FG 76 has a register that receives the data word sent over the serial bus, though the data is only read into the device if a select signal designating that device is also received. Otherwise, the data word is merely shifted out of the register and the data word associated with the next select signal is shifted in with the next command. Thus, when the controller 70 writes to the RXLO 72, all three devices receive the data word but only the RXLO 72 actually reads because it is the only device that receives a select signal that identifies the RXLO 72.

Indoor cellular systems such as the one described above have become widely popular for several reasons. First, a cellular customer can use the same telephone everywhere he/she goes. Second, the cellular telephone of the customer does not need additional circuitry to allow for indoor use as do some cellular telephones that operate as cordless telephones indoors. Third, indoor cellular systems provide larger coverage areas indoors than do typical cellular telephones operating in a cordless mode indoors. Fourth, the capacity of an indoor cell can be increased easily by adding additional wall mounted base stations.

However, a limitation of indoor cellular systems is the size and cost of the wall mounted base stations 24. The size of a wall mounted base station 24 can easily become obtrusive when designed to include more circuit boards 66 so as to increase channel capacity. Thus, endlessly adding more circuit boards to increase the number of channels is usually not a viable option. Therefore, additional wall mounted base stations must be added at a sizeable cost. Therefore, a need exists in the market for smaller and less obtrusive wall mounted base stations that cost less and service more channels.

SUMMARY OF THE INVENTION

It is therefore an object of the present invention to provide a cellular base station with a transceiver circuit board having two separate transceivers that share common resources.

It is another object of the present invention to provide a cellular base station transceiver circuit board having two transceivers that share a common local oscillator.

It is another object of the present invention to provide two cellular base station transceivers that share a common local oscillator without any handshaking or communication between the two transceivers.

It is yet another object of the present invention to provide a cellular base station having a reduced size, fewer parts, and lower cost than prior art base stations configured for indoor use.

These and other objects of the present invention are provided by a cellular radiotelephone base station that is configured for indoor use and that includes a transceiver circuit board having two transceivers and an arbitrator for managing shared resources such as common local oscillators thereon. During power up or activation of the transceivers, the arbitrator detects the first one of the transceivers that tries to send a command to the common local oscillator and then connects the controller of that transceiver to the shared common local oscillator to the exclusion of the other transceiver. Since the controllers send the same command to the common local oscillator at power up, it does not matter which one actually communicates the command to the common local oscillator. Therefore, the control logic of the controllers does not need to be modified for the present invention, nor do the controllers need to communicate with one another when writing a command to the shared common local oscillator. Further, because the transceivers share the common local oscillator, fewer parts may be used on the transceiver circuit board, which can reduce both the cost and size of the transceiver circuit boards, and thus, the cost and size of the wall mounted base stations.

In particular, according to the present invention, a circuit board for use in a cellular radiotelephone base station comprises a first cellular radio transceiver including a first controller that controls the operation of the first transceiver, a second cellular radio transceiver including a second controller that controls the operation of the second transceiver, a common local oscillator that generates a frequency signal for use by the first and second transceivers in tuning a radio signal, and an arbitrator that is connected to the first and second controllers and that determines which of the first and second controllers communicates with the common local oscillator.

In accordance with a feature of the present invention, the arbitrator may be connected to the first and second controllers by first and second bus lines, respectively, wherein the arbitrator monitors the first and second bus lines to determine the first one of the controllers that attempts to communicate with the common local oscillator so that the controller which attempts to communicate with the common local oscillator first is given control of the common local oscillator to the exclusion of the other controller. In addition, the arbitrator is responsive to a reset signal from the controller that has control for resetting the arbitrator so that the controllers may once again vie for control of the common local oscillator.

In accordance with another feature of the present invention, the circuit board may include a second common local oscillator that is shared by the first and second transceivers in substantially the same manner as described above. For instance, the first common local oscillator may be provided for tuning radio signals in the received signal paths of the first and second transceivers, and the second common local oscillator may be provided for tuning radio signals in the transmit signal paths of the first and second transceivers. Therefore, only two local oscillators are necessary for a circuit board having two transceivers.

The arbitrator can be implemented as a state machine by a programmable device such as a programmable logic device (PLD), a programmable array logic (PAL) device, a field programmable gate array (FPGA) device, a complex programmable logic device (CPLD) or an application specific integrated circuit (ASIC). Alternatively, the arbitrator can be implemented by a programmable device in combination with a tristate buffer. In the case of the latter, the programmable device monitors the first and second serial buses and sends a connect signal to the tristate buffer that either connects the first serial bus or the second serial bus to the common local oscillator when one of the controllers first attempts to communicate with the common local oscillator. As before, the programmable device can be any suitable programmable device such as a PLD, PAL, FPGA, CPLD or ASIC device.

A method in accordance with the present invention for sharing a common local oscillator by a first transceiver and a second transceiver that are co-located on a circuit board and configured for use in a cellular radiotelephone base station, wherein the first transceiver includes a first controller and the second transceiver includes a second controller, comprises the following steps. One step includes detecting when one of the first and second controllers attempts to communicate with the common local oscillator. Another step includes connecting the controller that attempts to communicate with the common local oscillator to the common local oscillator for line communication therebetween. A further step includes monitoring the first and second controllers for a signal to determine which of the first and second controllers attempts to communicate with the common local oscillator first.

Other features and advantages of the present invention will become apparent to one with skill in the art upon examination of the following drawings and detailed description. It is intended that all such additional features and advantages be included herein in the scope of the present invention, as defined by the appended claims.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The elements of the drawings are not necessarily to scale, emphasis instead being placed upon clearly illustrating the principles of the present invention. Furthermore, like reference numbers refer to like elements throughout.

Figure 1:
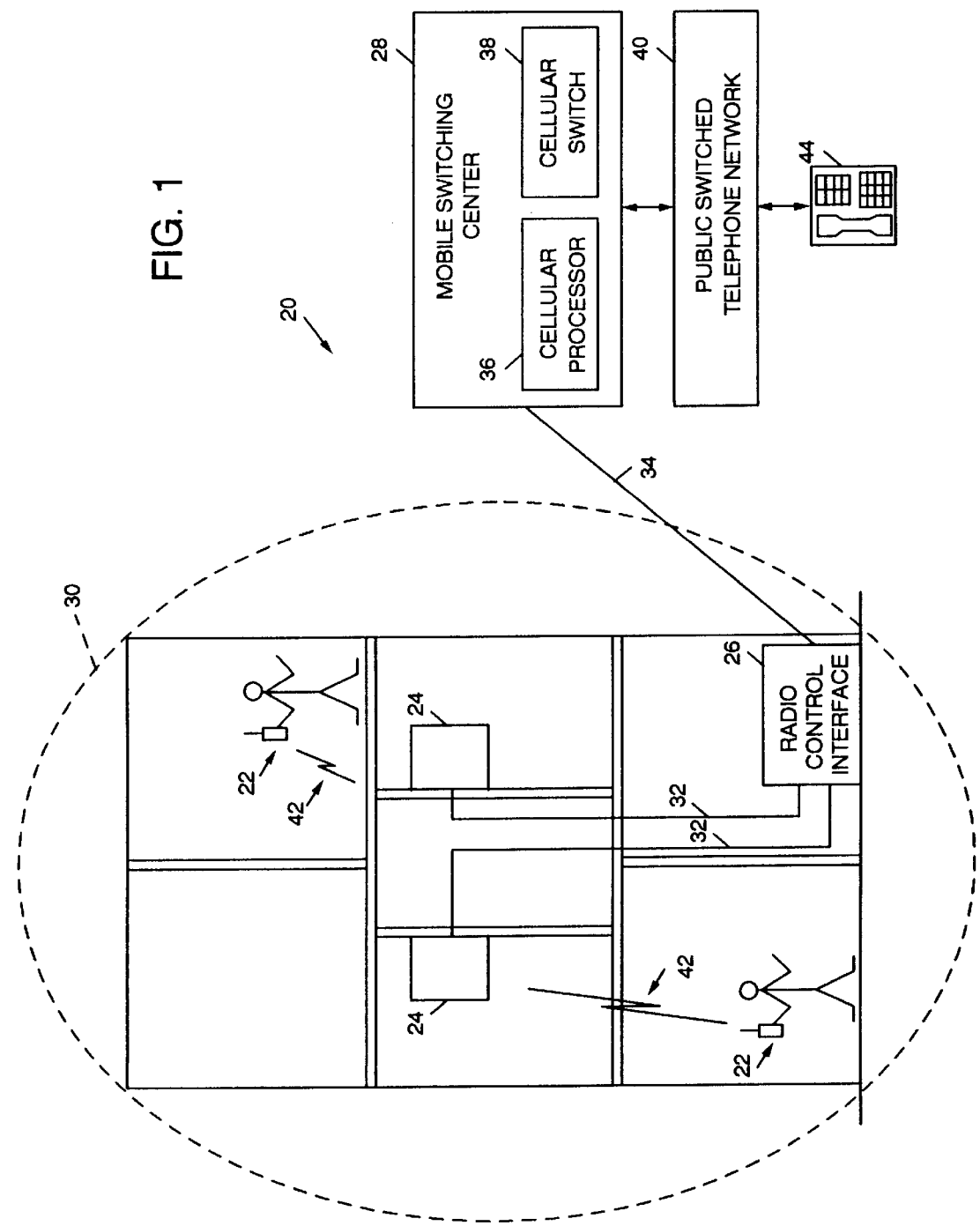
FIG. 1 is a schematic block diagram illustrating basic components of an indoor cellular communication system as in the prior art.
Figure 2:
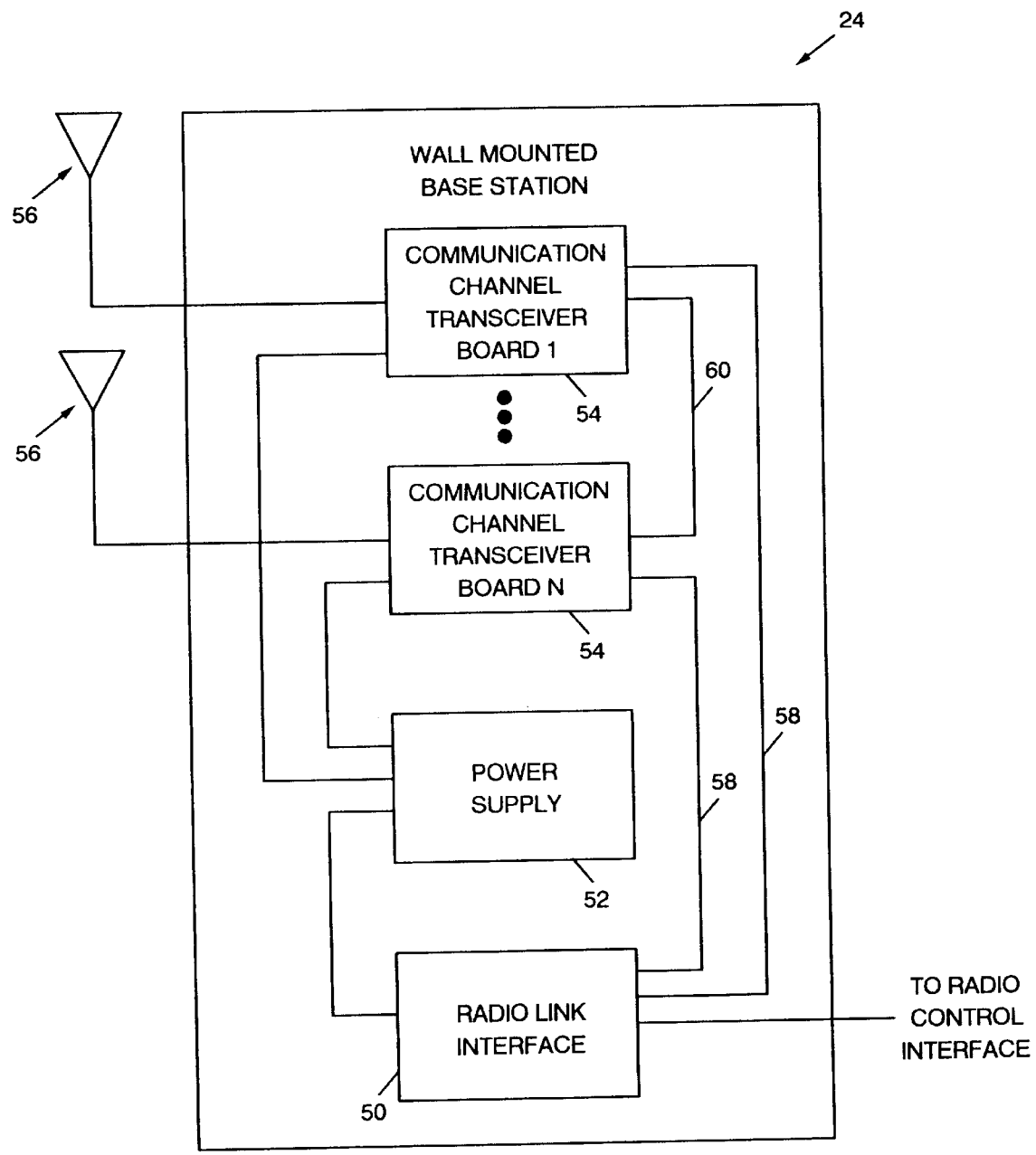
FIG. 2 is a schematic block diagram illustrating the functional components of a wall mounted base station of the indoor cellular communication system of FIG. 1.
Figure 3:
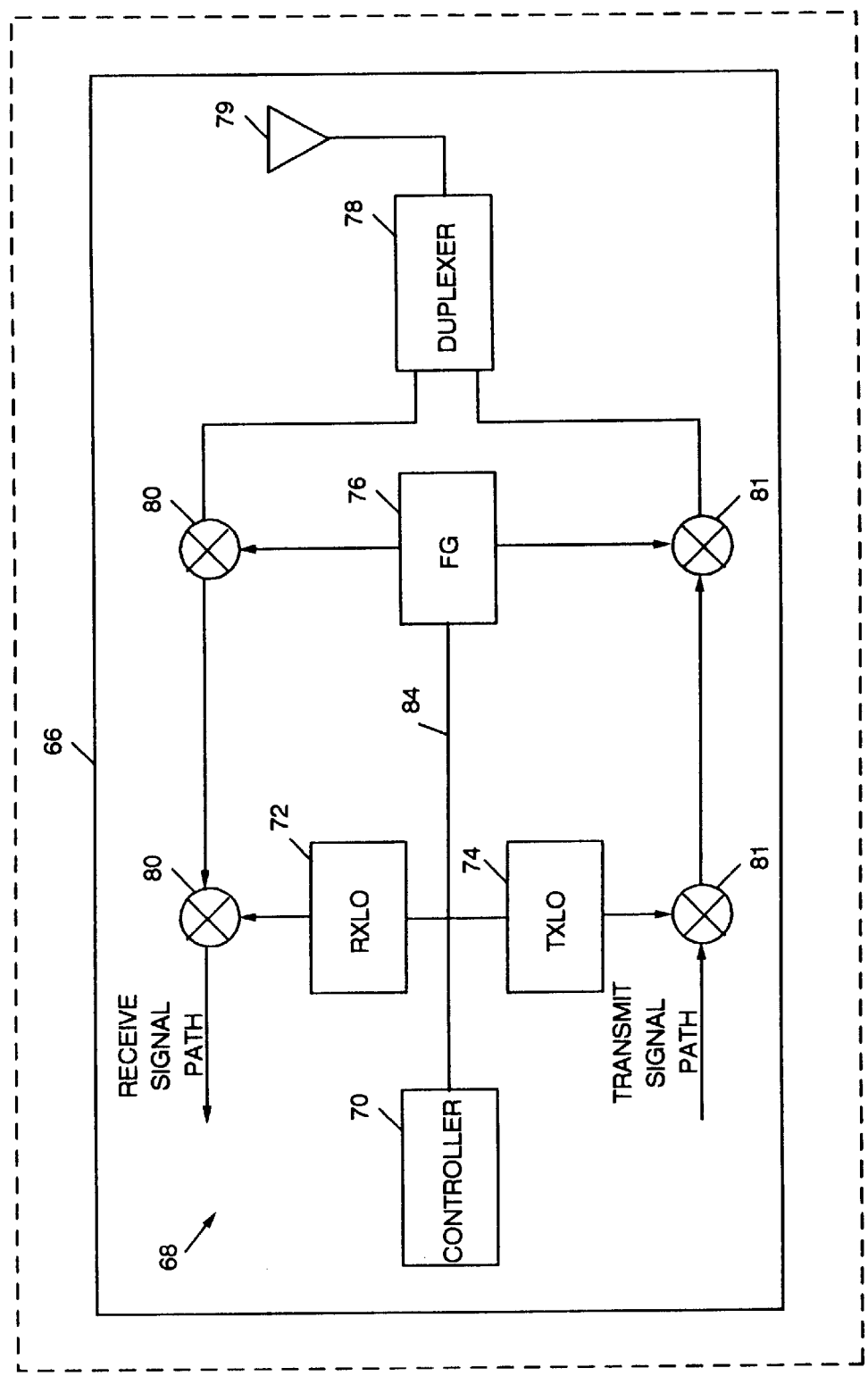
FIG. 3 is a schematic block diagram illustrating the functional elements of a communication channel transceiver board of the wall mounted base station of FIG. 2.
Figure 4:
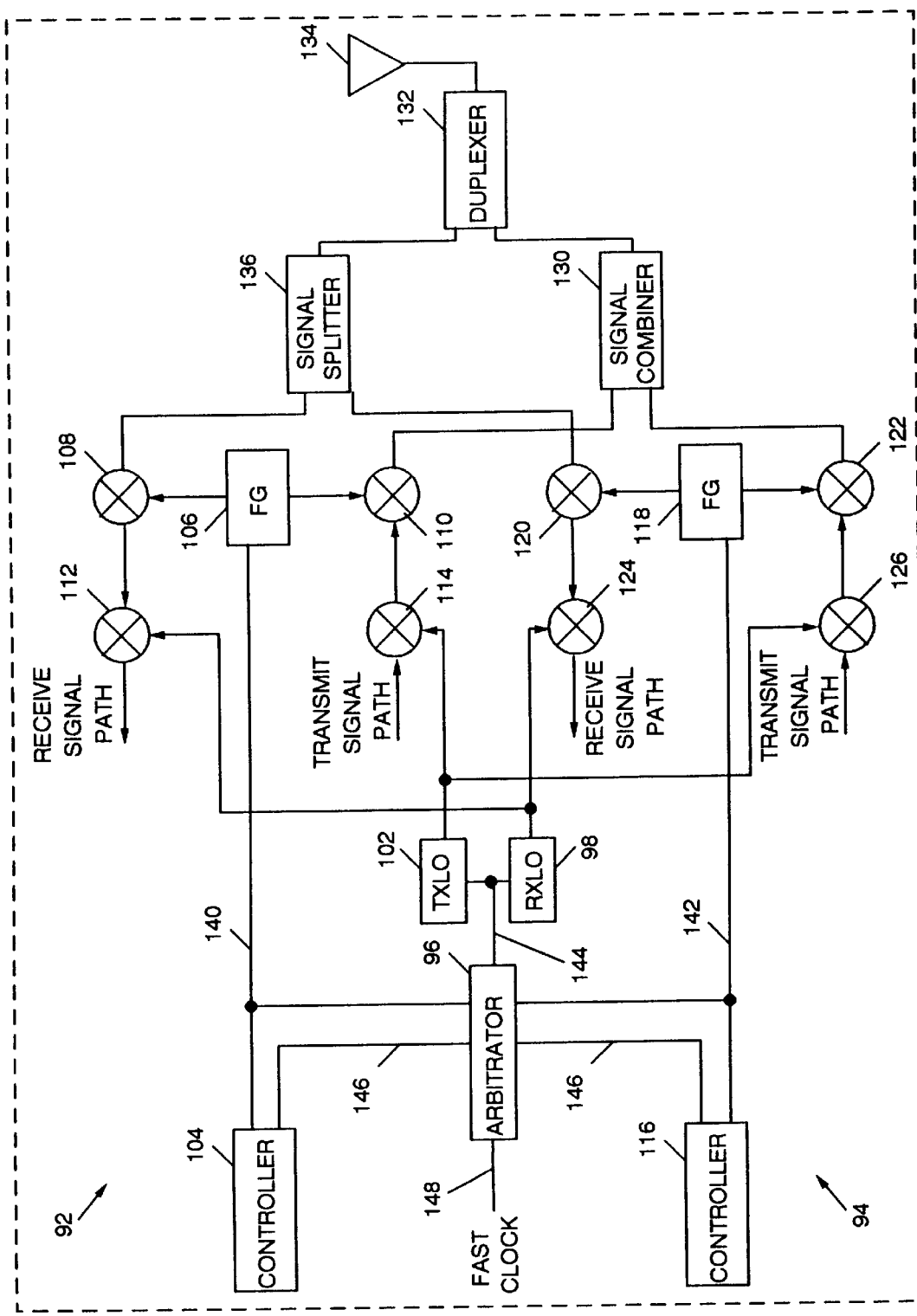
FIG. 4 is a schematic block diagram illustrating the functional elements of a communication channel transceiver board of a wall mounted base station according to the present invention.

With reference to FIG. 4, illustrated is a dual transceiver board 90 in accordance with the present invention. The dual transceiver board 90 is suitable for implementation, or instance, in the wall mounted base station 24 (FIG. 2) of the indoor cellular communication system 20 (FIG. 1). The dual transceiver board 90 includes a first transceiver 92 and a second transceiver 94 integrated thereon. This is a particularly advantageous configuration for an indoor wall mounted base station because the size of the base station is critical for indoor cellular systems where the base stations are mounted to a wall in a work area of a building. A wall mounted base station incorporating dual transceiver boards only needs half the number of transceiver boards as previously needed to provide the same number of channels. Thus, the size of the wall mounted base station can be reduced from that of conventional wall mounted base stations.

The dual transceiver board 90 also includes an arbitrator 96 for managing common resources shared by the first and second transceivers 92, 94. For purposes of the present disclosure, the shared resources are a receive local oscillator (RXLO) 98 and a transmit local oscillator (TXLO) 102. Thus, rather than providing a separate RXLO and TXLO for each of the first and second transceiver 92, 94, the present invention provides for the sharing of a single RXLO 98 and a single TXLO 102 by both transceivers 92, 94, thereby reducing board space, part count, and costs associated with a wall mounted base station.

The first transceiver 92 includes a controller 104, RXLO 98, TXLO 102, a frequency generator (FG) 106, and mixers 108, 110, 112, and 114. Likewise, the second transceiver 94 includes a controller 116, RXLO 98, TXLO 102, a FG 118, and mixers 120, 122, 124, and 126. The first and second transceivers 92, 94 are configured substantially the same, and therefore, the following discussion will merely address the configuration of the first transceiver 92. The controller 104 is connected to the arbitrator 96 and the FG 106 by a serial bus 140. The controller 104 is further connected to the arbitrator by reset line 146.

As illustrated in FIG. 4, the arbitrator 96 interconnects the controller 104 with the RXLO 98 and the TXLO 102 via a common serial bus 144. The RXLO 98 is connected to the mixer 112 for performing the second down conversion of the received signal form the receive intermediate frequency to the baseband frequency. The TXLO 102 is connected to the mixer 114 for performing the first up conversion of the transmit signal from the baseband frequency to the transmit intermediate frequency. In addition, a fast clock signal is provided to the arbitrator 96 via a clock line 148. The FG 106 is connected to the mixer 108 for performing the first down conversion of the receive signal in the received signal path from a radio frequency to the receive intermediate frequency, and to mixer 110 for performing the second up conversion of the transmit signal in the transmit signal path from the transmit intermediate frequency to a radio frequency for transmission over a communication link.

The transmit signals of the first and second transceivers 92, 94 are combined by a signal combiner 130 which sends the combined signal to a duplexer 132 which isolates the transmit signal from the receive signal on an antenna 134. The received signals for each of the first and second transceivers 92, 94 are separated by a signal splitter 136. Further, it is known that the signals received over antenna 134 may be shared with other transceivers in order to provide diversity reception.

With regard to the shared RXLO 98 and the TXLO 102, it is noted that both the first and second transceivers 92, 94 have approximately the same receive intermediate frequency in their receive signal paths and approximately the same transmit intermediate frequency in their transmit signal paths. This enables a single RXLO to be shared by multiple transceivers for performing the second down conversion of the receive signal, and a single TXLO to be shared by multiple transceivers for performing the first up conversion of the transmit signal. The FG's 106, 118, however, generate different frequency signals that are particular to the channel of the respective transceivers, and therefore, are not shared resources.

In accordance with a feature of the present invention, the arbitrator 96 manages the sharing of the RXLO 98 and the TXLO 92 by the first and second transceivers 92, 94. The arbitrator essentially acts as a switch switch that connects either the controller 104 or the controller 116 to the common serial bus 144 so that the connected controller can write commands to the RXLO 98 and the TXLO 92 at power up or activation of the transceivers 92, 94. Without the arbitrator 96, the controllers 104, 116 may write commands over one another which would corrupt the data being sent to the shared resource. By including the arbitrator 96, the two transceivers 92, 94 can share the RXLO 98 and the TXLO 102 without any handshaking or communication between the two controllers 104, 116. This is an advantageous design because the control logic, and more specifically, the operating code, of a transceiver controller configured for use with a single transceiver circuit board can be used in controllers 104, 116 of the present invention without modification.

Thus, the controllers 104, 116 essentially operate as though they were connected to a dedicated RXLO or TXLO, as described in the Background section with reference to a single transceiver circuit board. During the power up or activation of the transceivers 92, 94, each of the controllers 104, 116 sends one command to each of the RXLO 98, TXLO 102 and their respective FG 106, 118. The commands are sent over serial buses 140 and 142, respectively, and are intended to lock the oscillator to the appropriate frequency. The serial buses 140, 142 are preferably five wire serial buses, wherein each command includes a command clock signal on a first line, data (e.g., a division ration) on a second line, a select RXLO signal on a third line, a select TXLO signal on a fourth line, and a select FG signal is on a fifth line.

The commands directed to the FG's 106, 118 include the FG select signal on the fifth line. The respective FG's 106, 118 receive the data signal into a register and then read in the data when the select FG signal is received. The other commands directed to the RXLO and TXLO are also received by the FG's 106, 118 but are not read because they are not accompanied by a select FG signal on the fifth line. The commands directed to the RXLO 98 and TXLO 102 are received by the arbitrator 96 over the serial buses 140 and 142. In a substantially continuous manner, the arbitrator samples the serial buses 140, 142 for an incoming command clock signal. The fast clock signal provided over clock line 148 is used to establish a sampling rate for sampling the serial buses 140, 142. Preferably, the fast clock signal is approximately 19.44 megahertz (MHz). Since the command clock signal on the serial bus line is typically less than 1 MHz, the sampling rate is sufficiently fast to detect the command clock signal and connect the corresponding serial bus 140, 142 with the common serial bus 144 without losing data. It will be understood that the fast clock signal needs to be faster than the command clock since there is a delay from the time when the command clock signal is detected by the arbitrator 96 to when the arbitrator 96 connects the selected serial bus line to the common serial bus 144. This delay causes the first command clock signal that passes through the arbitrator 96 to be shorter by maximum of one fast clock cycle. Thus, the fast clock signal should be chosen so that the shortening of the first serial clock pulse will not affect the data received by the RXLO 98 and TXLO 102.

Accordingly, once the arbitrator 96 detects that the one of the controllers 104, 116 is attempting to send a command over one of the serial buses 140, 142, the arbitrator connects the serial bus of the controller that attempts first to the common serial bus 144. Once the selected controller is connected to the common serial bus 144, the arbitrator blocks the other controller from writing to the RXLO 98 and TXLO 102. The controller that is connected to the common serial bus 144 can then write commands to the RXLO 98 and the TXLO 102 for tuning them to their appropriate frequencies for use by both transceivers 92, 94. Again, since the controllers 104, 116 send the same commands to the RXLO 98 and TXLO 102, it does not matter which one actually sends the command.

The arbitrator 96 is also connected to each controller 104, 116 by a reset line 146. The reset line 146 enables the controller that is connected to the common serial bus 144 to reset the arbitrator 96. When a reset signal is sent to the arbitrator 96, once again the arbitrator begins to monitor serial buses 140, 142. Therefore, the first controller than attempts to to write on one of the serial buses 140, 142 is connected to the common serial bus 144. Alternatively, the arbitrator 96 may be configured to be responsive to a reset signal from either control 104, 116 rather than move the controller connected to the common serial bus 144.

The arbitrator 96 is preferably implemented as a state machine by a programmable device such as a programmable logic device (PLD), a programmable array logic (PAL) device, field programmable gate array (FPGA) device, a complex programmable logic device (CPLD), or an application specific integrated (ASIC) device. The programmable device implementing the arbitrator 96 can be programmed, for example, using ABEL code. An example of suitable ABEL code for implementing an embodiment of the arbitrator 96 follows:

```
Module lo
Declarations
"Clocks
    fast_clk    pin;
"Inputs
    clk1        pin;    "serial clk from logic 1
    data1       pin;    "serial data from logic 1
    sel_lo11    pin;    "lo select from logic 1
    sel_lo12    pin;    "lo select from logic 1
    reset1      pin;    "reset from logic 1
"Outputs
    clock       pin istype 'com';
    data        pin istype 'com';
    sel_1       pin istype 'com';
    sel_2       pin istype 'com';
    q0, q1      pin istype 'reg_d,buffer'; "state machine reg
"state diagram
    lo_select = [q1,q0]; "State Machine setup
    s1 = 0;
    s2 = 1;
    s3 = 2;
    s4 = 3
equations
    lo_select.clk = fast_clk;
state_diagram lo_select
    state s1:
                clock = 0;
                data = 0;
                sel_1 = 0;
                sel_2 = 0;
                    If(clk1 #(clk1 & clk2)) then s2;
                    else if clk2 then s3;
                    else s1;
    state s2:
                clock = clk1;
                data = data1;
                sel_1 = sel_lo11;
                sel_2 = sel_lo12;
                    If !reset1 then s1;
                    else s2;
    state s3:
                clock = clk2;
                data = data2;
                sel_1 = sel_lo21;
                sel_2 = sel_lo22;
                    If !reset2 then s1;
                    else s3;
    state s4:
                if s4 then s1;
end
```

Figure 5:
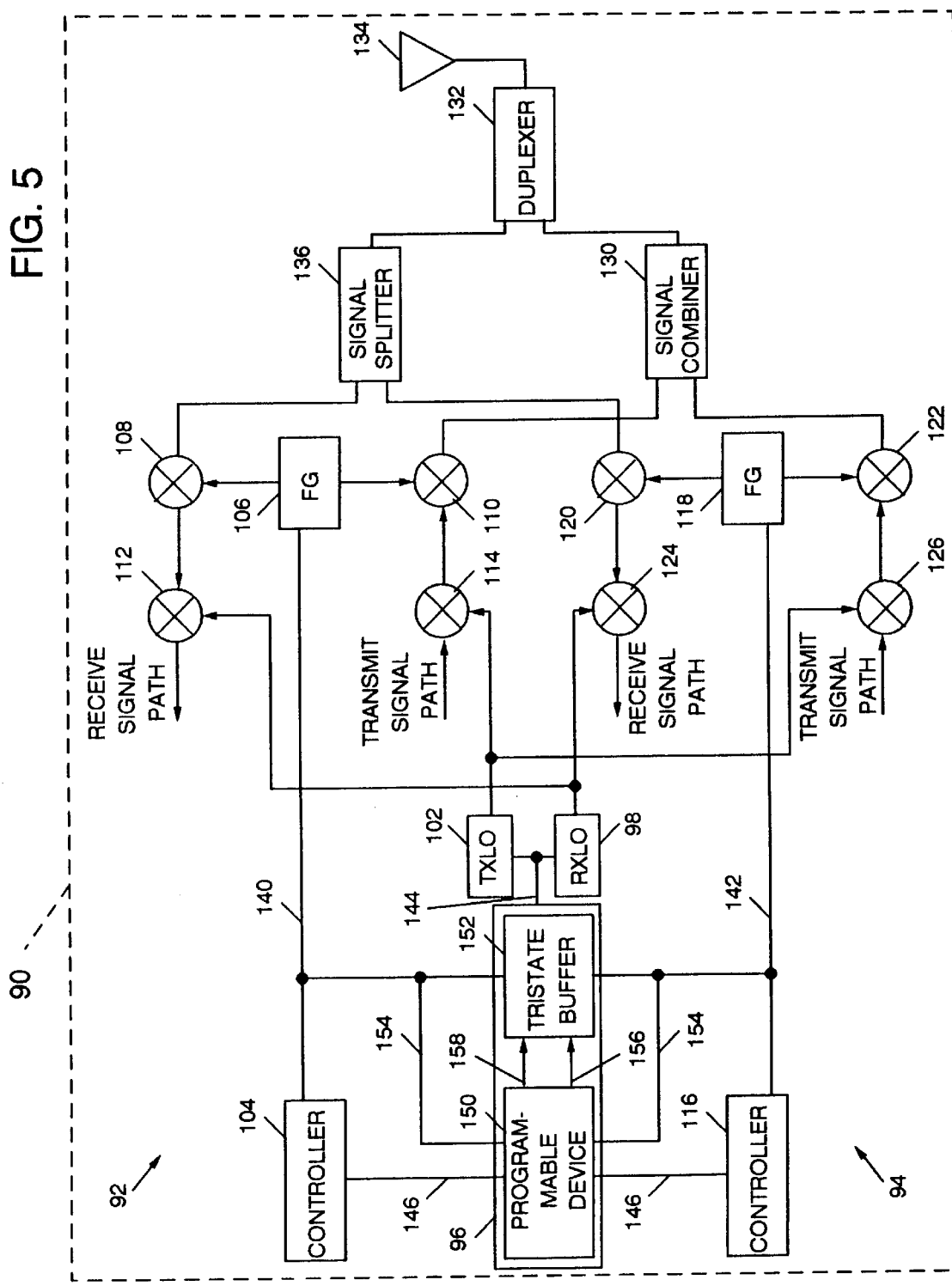
FIG. 5 is a schematic block diagram illustrating the functional elements of a communication channel transceiver board in accordance with the present invention, wherein the arbitrator is implemented by a programmable array logic device and a tristate buffer.

Alternatively, the arbitrator 96 can be implemented by a programmable device 150 and a tristate buffer 152, as illustrated in FIG. 5. The programmable device 150 can be implemented by any suitable programmable device such as a PLD, PAL, FPGA, CPLD or ASIC device. In this configuration, the programmable device 150 monitors the command clock signal lines 154 of the respective controller 104, 116. Upon detecting a command clock signal on one of the lines 154, the programmable device 150 generates a selection signal that is sent to the tristate buffer over either line 156 to select controller 116 or over line 158 to select controller 104. The tristate buffer 152 performs the switching function based upon the signals received over lines 156, 158. When a select signal is received by the tristate buffer 152 it connects the serial bus of the selected controller to the common serial bus 144. The reset lines 146 are connected to the programmable device 150 for resetting the programmable device 150 and allowing arbitration once again for control of the shared local oscillator.

The programmable device 150 can be programmed, for example, using ABEL code. An example of suitable ABEL code for implementing an embodiment of the present invention follows:

```
Module lo_raref
Declarations
"Clocks
    clk_1944    pin;    "fast clock signal
"Inputs
    clk1        pin;    "serial clk from controller 1
    reset1      pin;    "dsptxres from logic 1
    clk2        pin;    "serial clk from controller 2
    reset2      pin;    "dsptxres from logic 1
"Outputs
    select_lo_1    pin istype 'com'; "select side one serial lo bus
    select_lo_2    pin istype 'com'; "select side two serial lo bus
    q0,q1          pin istype 'reg_d,buffer'; "state machine lo
"state diagram
    lo_select = [q1,q0]; "State Machine setup
    s1 = 0;
    s2 = 1;
    s3 = 2;
    s4 = 3;
equations
    lo_select.clk = clk_1944;
state_diagram lo_select
    states 1:
                select_lo_1 = 1;
                select_lo_2 = 1;
                    If (clk1 # (clk1 & clk2)) then s2;
                    else if clk2 then s3;
                    else s1;
    state s2
                select_lo_1 = 0;
                select_lo_2 = 1;
                    If !reset1 then s1;
                    else s2;
    state s3:
                select_lo_1 = 1;
                select_lo_2 = 0;
                    If !reset2 then s1;
                    else s3;
    state s4:
                if s4 then s1;
end
```

Figure 6:
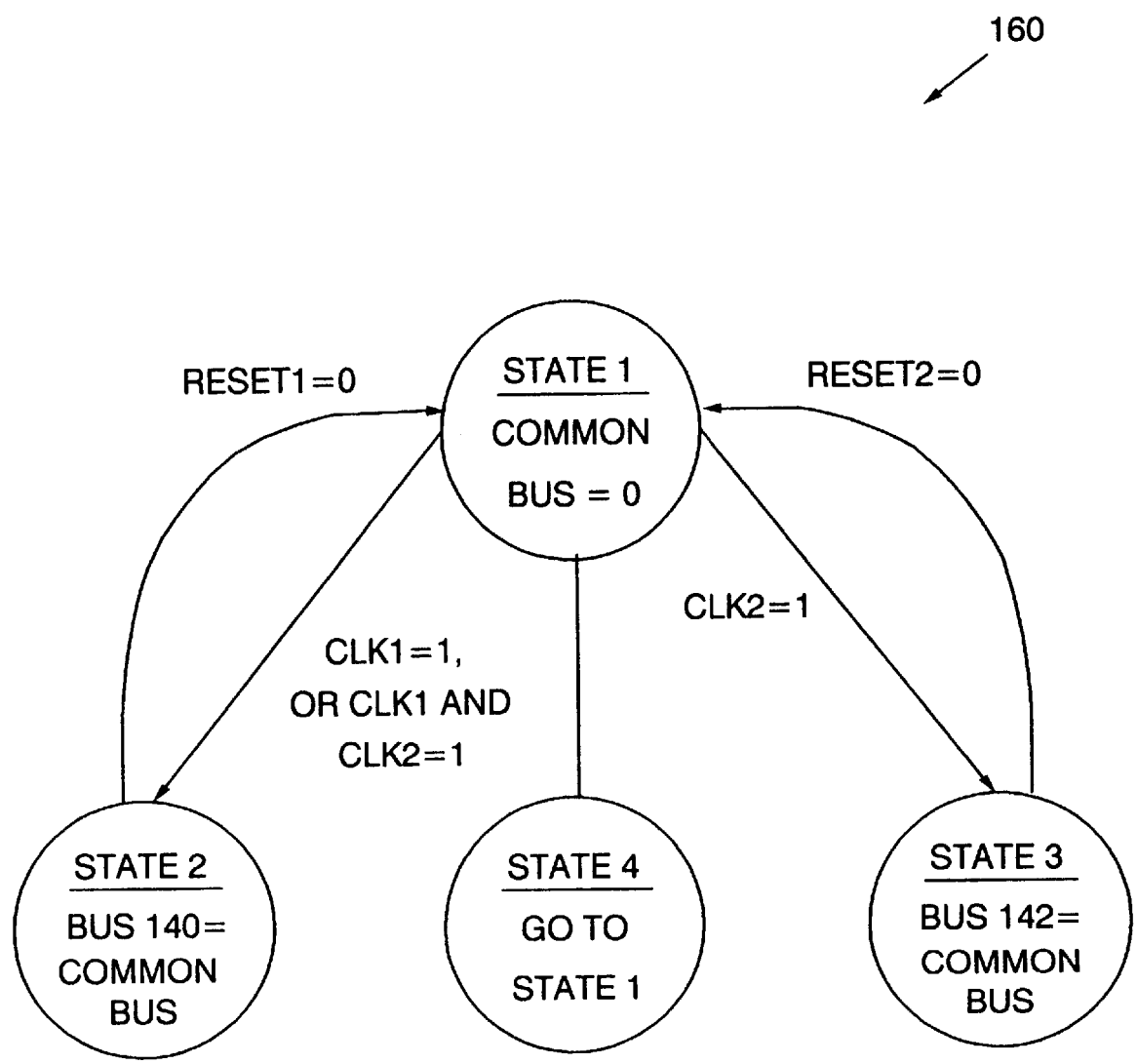
FIG. 6 is a state diagram illustrating the operation of an arbitrator according to the present invention.

The operation of the present invention in accordance with either embodiment above can be illustrated by a state machine 160 provided in FIG. 6. In the state machine 160 there are two controllers that can potentially control the common resource(s), e.g., a RXLO and/or a TXLO. A first controller has associated with it a clock line CLK1, a serial data line BUS1, and a reset line RESET1, and a second controller has associated with it a clock line CLK2, a serial data line BUS2, and a reset line RESET2. Further, the common resource is connected to common serial data line COMMON BUS. State machine 160 starts off in STATE1 where there is no activity on the clock line of either controller's serial clock line, and stays in STATE1 until one of the controllers attempts to write to a common resource. Then one fast clock cycle after activity occurs on either of the serial clock lines, the state machine 160 jumps to STATE2 or 3 depending upon which controller was trying to write to the common resource. In either STATE2 or 3, the controlling controllers' serial data line is connected to the common serial data line and the other controller is not allowed access to the common serial data line. The state machine 160 jumps back to STATE1 when it receives a reset signal from the controller that it connected to the common serial data line. If activity is detected on both clock lines simultaneously, then the state machine 160 jumps to STATE2 where the serial data line of the first controller is connected to the common serial data line as a default. However, the default connection could alternatively have been made to the serial data line of the second controller since both controllers write equivalent commands to the common resource.

In the drawings and specification, there have been disclosed typical preferred embodiments of the invention and, although specific terms are employed, they are used in a generic and descriptive sense only and not for purposes of limitation, the scope of the invention being set forth in the following claims.

I claim:

1. A transceiver board for use in a cellular radiotelephone base station, comprising:

a first cellular radio transceiver including a first controller that controls the operation of said first transceiver;

a second cellular radio transceiver including a second controller that controls the operation of said second transceiver;

a common local oscillator that generates a tuning signal used by said first transceiver and said second transceiver for tuning a radio signal; and an arbitrator that is connected to said first controller and said second controller and that determines which of said first and second controllers communicates with said common local oscillator.

2. The transceiver board of claim 1, further comprising a second common local oscillator that tunes radio signals of said first transceiver and said second transceiver, wherein said arbitrator determines which of said first and second controllers communicates with said second common local oscillator.

3. The transceiver board of claim 1, further comprising first and second bus lines, wherein said arbitrator is connected to said first and second controllers by respective said first and second bus lines, and wherein said arbitrator monitors said first and second bus lines to determine which one of said first and second controllers attempts to communicate with said common local oscillator so that said one of said first and second controllers is allowed to communicate with said common local oscillator.

4. The transceiver board of claim 3, wherein said arbitrator comprises a programmable device that monitors said first and second bus lines, and a tristate buffer device that is responsive to said programmable device and that connects one of said first and second bus lines to said common local oscillator.

5. The transceiver board of claim 1, wherein said arbitrator is responsive to a reset signal from said one of said first and second controllers communicating with said common local oscillator to reset said arbitrator.

6. The transceiver board of claim 1, wherein said arbitrator comprises a programmable device.

7. A transceiver board for use in a cellular base station, comprising:

a first cellular radio transceiver including first control means for controlling the operation of said first transceiver;

a second cellular radio transceiver including second control means for controlling the operation of said second transceiver;

common local oscillator means for generating a tuning signal used by said first and second transceivers for tuning a radio signal; and arbitrator means connected to said first and second transceivers for determining which one of said first and second controller means communicates with said common local oscillator means.

8. The transceiver board of claim 7, wherein said arbitrator means comprises a programmable device.

9. The transceiver board of claim 7, further comprising first and second bus means, wherein said arbitrator means is connected to said first and second controller means by respective said first and second bus means, and wherein said arbitrator means monitors said first and second bus means to determine which one of said first and second controller means attempts to communicate with said common local oscillator means first so that said one of said first and second control means is allowed to communicate with said common local oscillator.

10. The transceiver board of claim 9, wherein said arbitrator means comprises a programmable device that monitors said first and second bus means lines, and a tristate buffer device that is responsive to said programmable device and that connects one of said first and second bus means lines to said common local oscillator means.

11. A method for sharing a local oscillator by a first transceiver and a second transceiver that are co-located on a transceiver board configured for use in a cellular radiotelephone base station, wherein said first transceiver includes a first controller and said second transceiver includes a second controller, said method comprising the steps of:

detecting when one of said first and second controllers attempts to communicate with said common local oscillator; and connecting said one of said first and second controllers to said common local oscillator for allowing communication with said common local oscillator.

12. The method of claim 11, wherein the step of detecting includes the step of monitoring said first and second controllers for a signal to determine which of said first and second controllers attempts to communicate with said common local oscillator first.

13. The method of claim 11, wherein the steps of detecting and connecting are performed by a programmable device.

14. A cellular radiotelephone base station for receiving and transmitting cellular communications, wherein said cellular radiotelephone base station is connected to a mobile switching center, said cellular radiotelephone base station comprising:

a cellular antenna;

a transceiver board connected to said antenna and comprising:

a first cellular radio transceiver including a first controller for controlling operation of said first transceiver, a second cellular radio transceiver including a second controller for controlling operation of said second transceiver, a receive local oscillator for generating a first tuning signal used in second down conversion stages of said first and second transceivers, a transmit local oscillator for generating a second tuning signal used in first up conversion stages of said first and second transceivers, and an arbitrator that is connected to said first transceiver and said second transceiver, and that selectively determines which of said first and second controllers may communicate with said receive local oscillator and said transmit local oscillator; and a power supply.

15. The cellular radiotelephone base station of claim 14, further comprising a radio link interface that interfaces said transceiver board and said mobile switching center.

* * * * *